United States Patent [19]

Granger et al.

[11] 4,051,999
[45] Oct. 4, 1977

[54] ENVIRONMENTALLY HEATED AND COOLED BUILDING

[76] Inventors: Floyd Randolph Granger, 24 Heard Drive; Michael Gerard Granger, 10 Delores St., both of Greenville, S.C. 29605

[21] Appl. No.: 673,664

[22] Filed: Apr. 5, 1976

[51] Int. Cl.$^2$ .......................... F24D 5/00; F24D 11/00; F24J 3/02; G05D 23/00
[52] U.S. Cl. .................................. 237/1 A; 126/270; 126/400; 236/91 A
[58] Field of Search .............. 237/1 A; 126/270, 271, 126/400; 98/31, 103; 236/91 A

[56] References Cited
U.S. PATENT DOCUMENTS

| | | | |
|---|---|---|---|
| 2,559,869 | 7/1951 | Gay | 237/1 A |
| 2,559,870 | 7/1951 | Gay | 126/270 X |
| 2,601,905 | 7/1952 | Anderegg | 126/270 X |
| 2,649,726 | 8/1953 | Wyman | 98/31 |
| 2,680,565 | 6/1954 | Löf | 165/18X |
| 3,254,703 | 6/1966 | Thomason | 165/48 |
| 3,412,728 | 11/1968 | Thomason | 126/270 |
| 3,841,302 | 10/1974 | Faibei | 237/1 A X |
| 3,949,732 | 4/1976 | Reines | 237/1 A X |
| 4,006,856 | 2/1977 | Nilsson | 98/31 X |

*Primary Examiner*—William E. Wayner
*Assistant Examiner*—Larry Jones
*Attorney, Agent, or Firm*—Bailey, Dority & Flint

[57] ABSTRACT

A solar heated building including a thermal collector means which is carried in the attic of the building for absorbing energy and heating the air within the attic. Duct means are connected between the attic and a thermal storage chamber carried below the bottom floor of the building. The thermal storage includes a rock bed extending substantially under the entire area of the house with the joists which support the bottom floor of the building resting on top of the thermal storage chamber. Registers are carried in the floor extending between the space provided between a pair of adjacent joists so that conditioned air can be fed between the joists to the registers for either heating or cooling the house. Control means which are activated by strategically located sensors are utilized for opening and closing dampers for controlling the flow of air through the building.

4 Claims, 5 Drawing Figures

ENVIRONMENTALLY HEATED AND COOLED BUILDING

BACKGROUND OF THE INVENTION

The present invention relates to a solar heated building and more particularly to a building wherein solar energy is utilized for heating the building and outside air may be utilized for aiding in cooling the building.

Solar heated houses are well known and an example of one such solar heated house is disclosed in U.S. Pat. No. 3,254,703. In this particular patent, solar energy is provided for heating water flowing over collector plates provided in the roof of the home. This water is circulated through a bed of rocks for heating the rocks for subsequent use in reheating the home when the outside temperature drops.

Another solar heating apparatus and method is disclosed in U.S. Pat. No. 2,680,565 which discloses a building wherein the solar energy is used for heating air which is subsequently circulated through the house and passes through a chamber filled with rocks for storing heat therein. When it is desired, the air in the house is recirculated through the rocks for absorbing heat therefrom for heating the house.

While these and many other devices may be satisfactory for heating houses with solar energy, they are relatively expensive since they normally require special duct work and collectors.

SUMMARY OF THE INVENTION

This invention relates to a solar heated building comprising a collector means which is carried in the attic of the building for absorbing solar energy and heating the air within the attic. A thermal storage chamber is carried below the bottom floor of the building and includes a rock bed extending substantially under the entire area of the floor. A lower plenum is positioned substantially in the middle of the rock bed and extends transverse thereto. Air flow passages are provided in opposite walls of the lower plenum and extend into the rock bed. Air ducts are connected between the attic and the lower plenum through which conditioned air passes between the attic and the storage chamber. A fan is connected to the duct for circulating air therethrough.

Joists which support the bottom floor of the building are carried directly on top of the thermal storage chamber. Registers are carried in the floor and extend into a space provided between pairs of adjacent joists so that the space between the joists acts as an air flow duct.

Dampers are provided within the ducts which can be automatically manipulated to control the air flow throughout the building. Sensors are positioned within the thermal storage chamber and at other various strategically located points both in and out of the buildings so that signals generated thereby can be used for activating the power operated dampers for controlling the air flow through the building, storage chamber and attic responsive to predetermined conditions.

Accordingly, it is an object of the present invention to provide a solar heated building with a storage chamber that not only provides a storage facility for thermal energy but it is utilized for supporting the building.

Still another important object of the present invention is to provide a building wherein a substantially conventional attic is used for collecting thermal energy.

Still another important object of the present invention is to provide a solar heated building wherein damper systems are selectively operated by a plurality of strategically located sensors for controlling the air flow through the building so as to maintain the desired temperature within the building.

These and other objects and advantages will become apparent upon reference to the following specification, attendant claims, and drawings.

DESCRIPTION OF A PREFERRED EMBODIMENT

Figure 5:
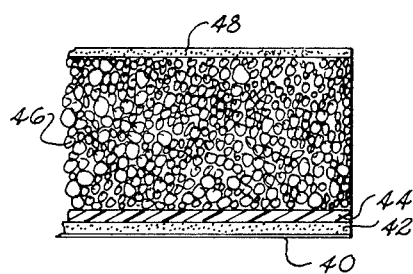
FIG. 5 is a sectional view taken along line 5—5 of FIG. 3.
Figure 1:
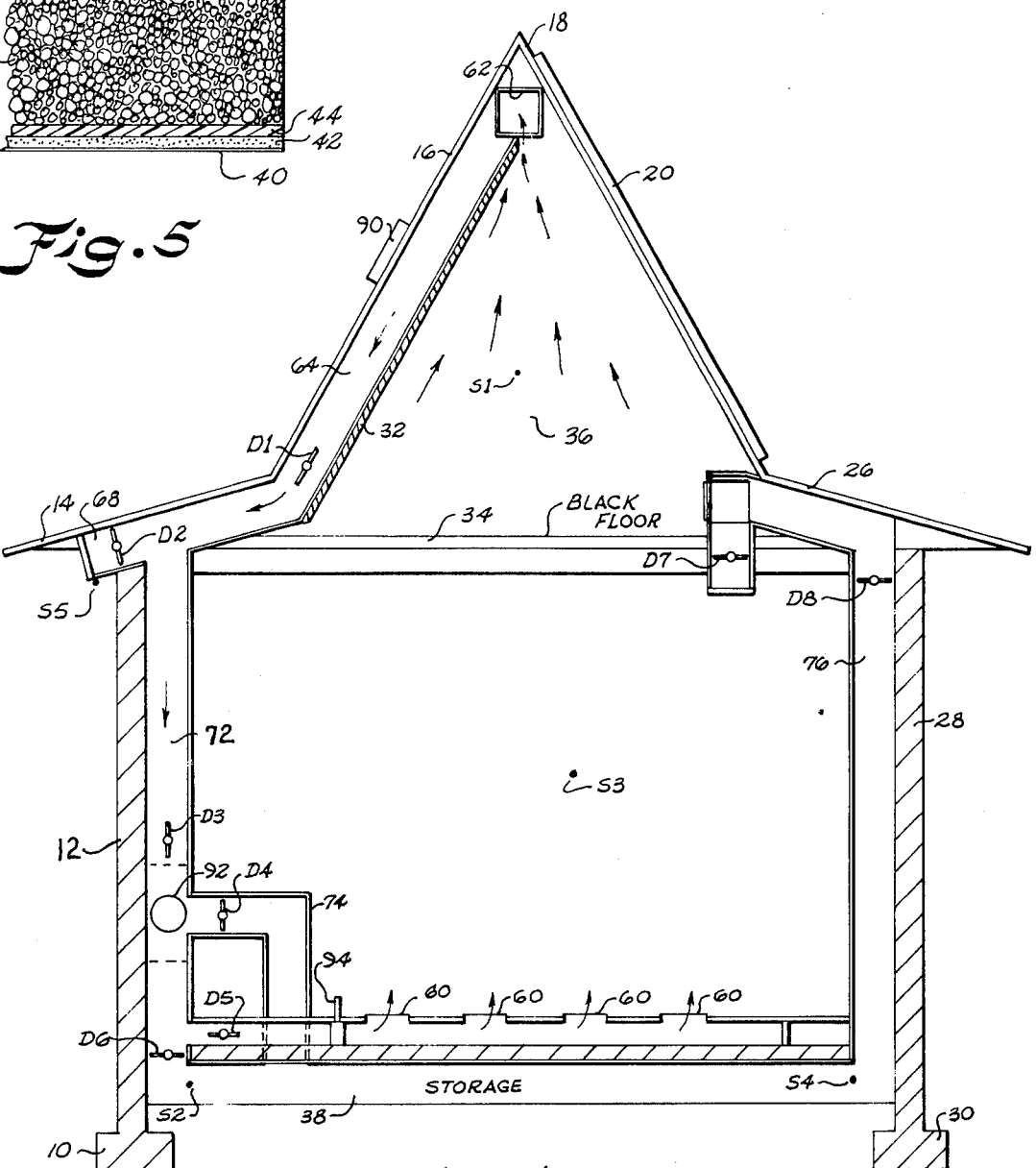
FIG. 1 is a vertical section through a structure such as a house utilizing the features of the present invention.
Figure 2:
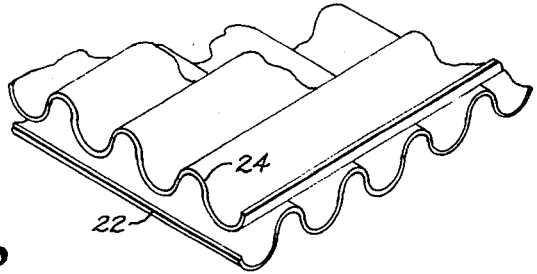
FIG. 2 is an enlarged fragmentary perspective view illustrating a portion of the roof of the house.
Figure 3:
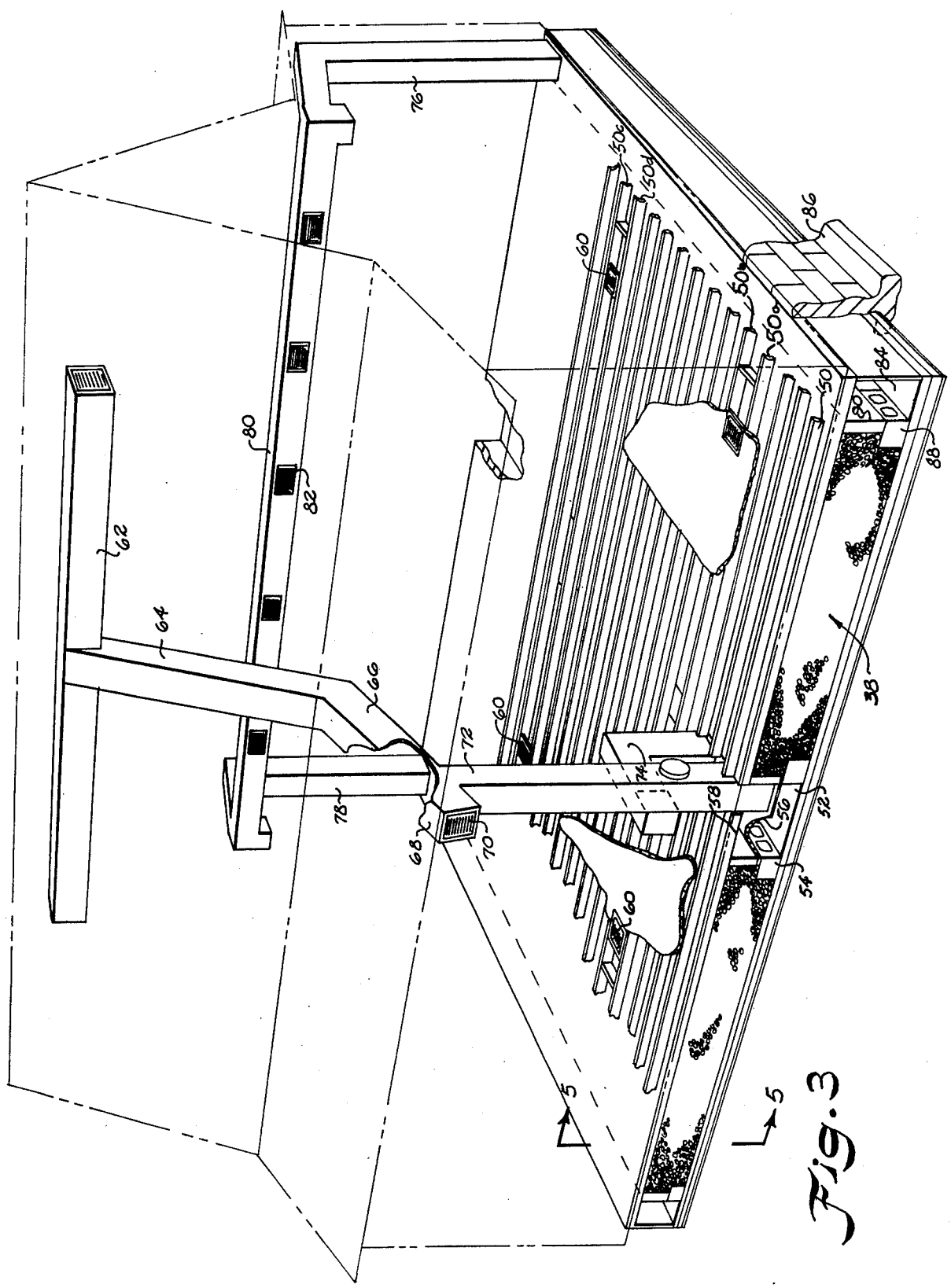
FIG. 3 is an enlarged perspective view with parts broken away for purposes of clarity, illustrating a portion of the air handling system for a house constructed in accordance with the present invention.

Referring in more detail to FIG. 1 of the drawing, there is illustrated a building such as a home in cross section. The home is constructed of a footing 10 having a foundation wall 12 extending upwardly therefrom and terminating in a roof section 14. The roof section 14 extends inwardly and upwardly from the wall and terminates in a high pitched section 16 which forms a portion of the apex of the roof.

Interposed in the other wall 18 of the roof is a translucent panel 20 which is constructed of fiberglass corrugated panels 22 and 24 positioned perpendicular to each other and secured to the truss by screws. By using a pair of corrugated panels such adds substantial strength to the roof. The other wall of the roof 20 terminates in a portion 26 which is supported on the other wall and footing 28 and 30, respectively.

Within the attic is a black surface panel 32 which may be in the form of sheets of plywood nailed to the truss having a black surface therein for absorbing thermal energy. A similar black surface 34 is nailed to the floor of the attic 36. Therefore, as the sun rays pass through the translucent panels 20, they strike the black surfaces 32 and 34 heating the air within the attic. Normally, it is desirable to position the house on a lot so that the panels 20 will be exposed to sunlight for a maximum number of hours during a given day.

A storage chamber generally designated by the reference character 38 not only provides an effective medium for storing thermal energy, it is also utilized as a supporting member for the joists which in turn support the bottom floor of the building. The storage chamber is enclosed within the foundation wall 12 of the building. The bottom of the storage chamber includes a polyethylene sheet 40 upon which a 1 inch layer of sand 42 is placed. Positioned on top of the 1 inch layer of sand 42 is a 1 inch layer of polystyrene 44 which insulates the bottom of the chamber. On top of the polystyrene, rocks 46 are placed for absorbing the thermal energy as heated air flows therearound. The rocks will hold the thermal energy until it is absorbed by cool air being forced therethrough. Positioned on top of the rocks is a sand and cement layer 48 which encloses the entire top of the chamber. The joist 50 for the bottom floor of the house rests directly on top of this sand and cement mixed layer 48.

The storage chamber is divided in half by a lower plenum 52 which extends across the building directly beneath the bottom floor. This lower plenum is defined by concrete blocks 54 which are stacked in a row on both sides. These concrete blocks 54 have holes therein through which air flows into the rock bed. Positioned on top of the concrete blocks is a sheet of any suitable material such as plywood 56. The plywood sheet 56 is also used to define the bottom of an upper plenum 58. The top of the upper plenum 58 is enclosed by the sand and cement mix 48.

Openings are provided in the covering 48 for providing access to the space between particular joists such as joists 50a and joists 50c and 50d. This enables the space between these joists to act as air passages for providing a path to registers carried in the bottom floor of the building.

The duct work for the building includes a T-shaped portion wherein a cross bar member 62 is carried in the upper portion of the attic. Vertically extending member 64 extends downwardly from the cross bar member and is connected to an angle portion 66. The other end of the angle portion 66 terminates in an outwardly extending arm 68 which has a vent 70 provided in the end thereof communicating with the exterior of the building. Extending downwardly from the arm 66 is a vertical main duct portion 72 which has its lower end connected directly to the lower plenum 52. A right angle plenum member 74 is connected between the main vertical duct 72 and the lower plenum 52. Return ducts 76 and 78 extend upwardly from a space provided in the storage chamber to the attic. In the attic extending between an upper portion of the return ducts 76 and 78 is a horizontal duct member 80 which has vents 82 provided therein for distributing the return air throughout the attic.

The lower end of the return air duct 76 as previously mentioned is connected to a transverse passage 84 carried below the floor. This passage is defined by the exterior wall 86 of the building on one side and a row of concrete blocks 88 on the other side with a separator 90 provided thereon. The concrete blocks 88 have holes therein through which air is permitted to flow. The attic 36 has a vent 90 provided therein which can be manually or automatically opened and closed for venting the attic during various conditioning cycles.

Dampers D1 through D8 are provided throughout the duct work within the house for controlling the flow of air therethrough. Damper D1 is interposed in the duct work 64 carried within the attic for opening and closing this duct. Damper D2 is interposed in arm 68 for selectively opening and closing the duct arm 68 for providing access to the exterior of the house. Damper D3 is interposed in the main vertical duct 72; damper D4 is interposed in the L-shaped duct 74; damper D5 is interposed in an arm extending from a sidewall of the main vertical duct 72 which communicates with the upper plenum 58; damper D6 is interposed in the bottom of the main vertical duct 60 where such connects to the storage chamber 38; damper D7 is a return air damper from the exterior of the house to attic; and damper D8 is interposed in return air duct 76 which connects the return air horizontal passage 84 with the attic.

Temperature sensors are strategically located inside and outside the building so as to indicate the temperature of the building at various points in order to determine the most beneficial or desirable path that the air flow should take in order to maintain the desired temperature within the building. There are five temperature sensors utilized with this system illustrated in the drawings, and as illustrated in FIG. 1, one of the temperature sensors S1 is located in the attic for sensing the temperature of the air therein. Temperature sensors S2 and S4 are located at the entrance and exit of the storage chamber 38 so as to sense not only the presence of usable temperature for operation of storage chamber as a thermal energy source but also the availability of thermal energy capacity remaining in the storage medium. This provides the control system with the necessary information to store the maximum thermal energy as possible and to effectively regulate the storage, and removal of thermal energy from the storage chamber in a tightly controlled manner. Temperature sensor S3 is located within the building for sensing the temperatures therein. Temperature sensor S5 is located directly under the eaves of the building on the outside for sensing the external or outside temperature.

The controls for opening and closing the dampers are programmed using any suitable logic circuit so that there are eight different modes of operation. Motors are coupled to each of the dampers for opening and closing the dampers according to a program when various temperature conditions occur. Below is a chart illustrating the various damper positions across the top for the eight different modes listed in the vertical column to the left.

| MODE | DAMPER POSITION | | | | | | | |
|---|---|---|---|---|---|---|---|---|
| | 1 | 2 | 3 | 4 | 5 | 6 | 7 | 8 |
| 1 | O | C | O | C | O | C | O | C |
| 2 | O | C | O | C | C | O | C | O |
| 3 | C | C | C | O | O | C | O | O |
| 4 | C | C | C | O | O | C | O | O |
| 5 | C | O | O | C | O | C | O | O |
| 6 | C | C | C | O | O | C | O | O |
| 7 | C | C | C | O | O | C | O | O |
| 8 | C | O | O | C | C | O | C | O |

For example, when it is desired to utilize the hot air within the attic to heat the house which is considered to be mode 1, dampers D1, D3, D5 and D7 are opened and dampers D2, D4, D6 and D8 are closed. In this condition, a fan 92 which is interposed in the main vertical duct, turns on and air is drawn through duct 32 and main vertical duct 72 and fed directly to the registers 60 and return through damper D7 back into the duct 80.

In mode 2, wherein it is desired to use the heat of the hot air within the attic to heat the rocks provided in the storage chamber 38, dampers D1, D3, D6 and D8 are opened and dampers D2, D4, D5 and D7 are closed. Accordingly, the hot air from the attic flows through duct 64, duct 60, opened damper D6 through the storage chamber 38 back up the return duct 76 to the attic. As a result, the hot air accumulated within the attic heats the rocks provided in the storage for subsequent use.

In mode 3, wherein it is desired to utilize the heat stored in the storage chamber 38 to heat the house, dampers D1, D2, D3, and D6 are closed, and dampers D4, D5, D7 and D8 are opened. In this condition, the air flow path is through the fan 92, through damper D5 to registers 60 up through the return damper D7, down duct 76 through the storage chamber 38 and back up through the L-shaped duct 74 to the fan. It is to be understood that the fan 92 always rotates in the same direction, therefore, the various paths of air flow for the other modes 4 through 8 would be obvious on opening and closing the dampers as illustrated in the above chart.

Mode 4 is identical to mode 3 with the exception that auxiliary heat is supplied by heating coils forming part of a combined heating and cooling system 94 for heating the circulated air. Similarly, mode 7 would have the identical air flow pattern as mode 4 with the exception that instead of the heating coil being activated, cooling coils carried in system 94 are activated for cooling the air flowing through the house.

In mode 5, the outside air is drawn into the house and circulated through the house and the attic and out of the vent 90 provided in the roof for cooling the interior of the house and the attic.

In mode 6, cool air flowing through the storage 38 is circulated through the house.

In mode 8, the outside air is drawn through storage chamber 38 and fed up duct 76 out of the vent 90 provided in the attic for utilizing the cool outside air for cooling the storage rocks.

As can be seen, the above described thermal energy house is very economical in that it utilizes the conventional portions of a house such as the joists carried below the floor for acting as duct paths. Similarly, a substantially conventional attic is utilized with the exception that one side of the roof is modified to permit the passage of light while retaining thermal energy in the attic.

Figure 4:
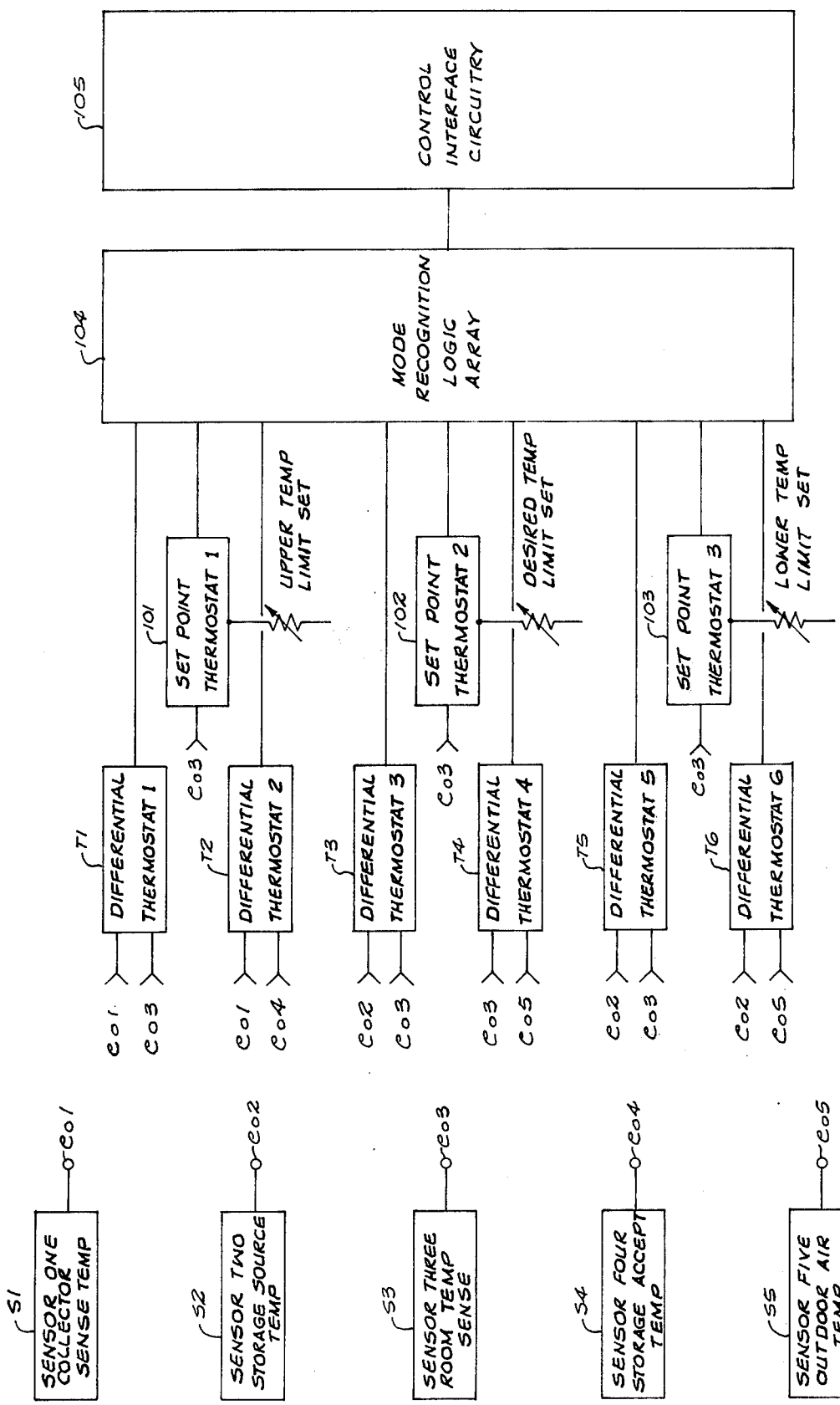
FIG. 4 is a block diagram illustrating the control circuit and sensors which are utilized for controlling the operation of the dampers throughout the air flow system.

Any suitable control may be used for selectively activating the motors for manipulating the dampers when various temperature conditions occur. FIG. 4 illustrates on circuit diagram wherein the five sensors which are strategically located produce output signals EO1 through EO 5, respectively. These output signals are connected to five differential thermostats T1 through T6 as illustrated which in turn generate signals on the outputs that are fed to a mode recognition logic array for selecting the particular mode when such temperature conditions occur. Normally, the only setting required by the occupant of the house is to set three thermostats 101, 102 and 103 which represent the upper temperature limit, the desired limit, and the lower temperature limit. These signals are also connected to the mode recognition circuit 104. The output of the mode recognition circuit 104 is connected through a control interface circuit 105 which in turn operates the motors for opening and closing the dampers according to a program set in the mode recognition logic array.

While a preferred embodiment of the invention has been described using specific terms, such description is for illustrative purposes only, and it is to be understood that changes and variations may be made without departing from the spirit or scope of the following claims.

What is claimed is:

1. In combination a solar heated building comprising: a collector means carried in the attic of said building for absorbing solar energy and heating the air within said attic, a thermal storage chamber carried below the bottom floor of said building, said thermal storage chamber including a rock bed extending substantially under the entire area of said floor, a lower plenum positioned substantially in the middle of said rock bed extending transverse thereof, air flow passages provided in opposite walls of said lower plenum extending into said rock bed, duct means connected between said attic and said plenum through which conditioned air passes between said attic and said storage chamber, a fan connected to said duct means for circulating air therethrough, registers carried in said floor and connected to said duct means for supplying conditioned air to said building, said duct means including an outside air arm communicating with the air outside said building, power operated damper means provided in said duct means for selectively controlling the path that said air flows through said storage chamber, said building, said attic and through said outside air arm, said thermal storage chamber having an inlet and outlet through which air flows, first and second sensors positioned adjacent said inlet and said outlet of said thermal storage chamber generating signals indicating the temperature at said locations, additional sensors located to generate signals indicating the temperature of the outside air, the temperature of the air in said attic and the temperature of the air in said building, and control means connected to said sensors for activating said power operated damper means for controlling the air flow path through said building, storage chamber and said attic responsive to predetermined conditions.

2. In combination a solar building comprising: a collector means carried in the attic of said building for absorbing solar energy and heating the air within said attic, a thermal storage chamber carried below the bottom floor of said building, said thermal storage chamber including a rock bed extending substantially under the entire area of said floor, a lower plenum located adjacent to said rock bed extending transverse thereof, air flow passages provided in a wall of said lower plenum extending into said rock bed, duct means connected between said attic and said lower plenum through which conditioned air passes between said attic and said storage chamber, a fan connected to said duct means for circulating air therethrough, registers carried in said floor connected to said duct means for supplying conditioned air to said building, said duct means including an outside air arm communicating with the air outside said building, power operated damper means provided in said duct means for selectively controlling the path that said air flows through said storage chamber, said building, said attic and through said outside air arm, said thermal storage chamber having an inlet and outlet through which air flows, sensors located to generate signals indicating the temperature of the outside air, the temperature of the air in said attic, the temperature of the air in said building, and the temperature of said storage chamber, and control means connected to said sensors for activating said power operated damper means for controlling the air flow path through said building, storage chamber and said attic responsive to predetermined temperature condition, whereby air can be conditioned, stored and supplied to the building for aiding in maintaining said building at a desired temperature.

3. The solar heated building as set forth in claim 2 further comprising:

a translucent section provided in a roof portion of said building for permitting solar energy to pass into said attic, and wherein said collector means includes a black surface collector sheet carried in said attic for receiving solar energy passing through said translucent section for heating the air in said attic.

4. The solar heated building as set forth in claim 2 further comprising:

attic vent means carried in said roof for selectively being open for providing a passage between said attic and the exterior of said building;

damper means carried in said duct means adapted to be manipulated to provide an air flow path from the exterior of said building through said rock bed, said attic and said attic vent means for selectively cooling said rock bed and said attic with outside air.

* * * * *